United States Patent Office 2,874,406
Patented Feb. 24, 1959

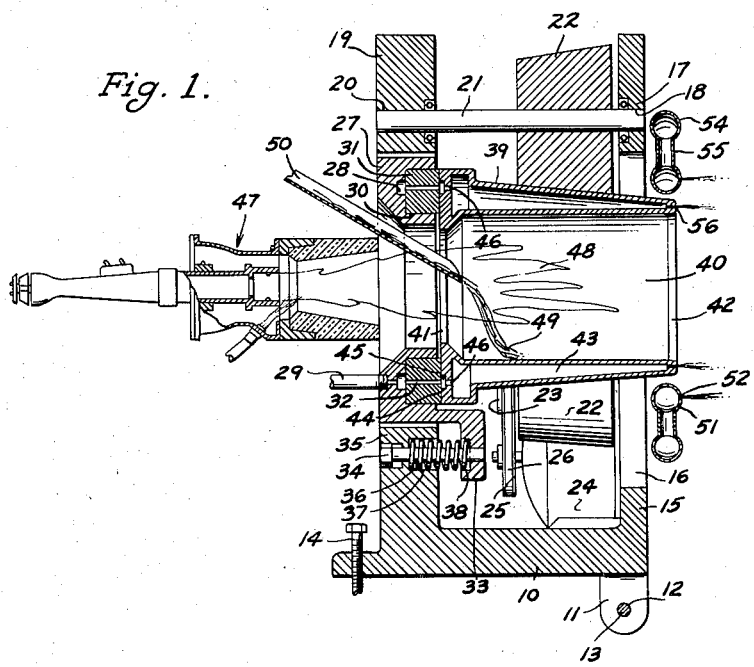
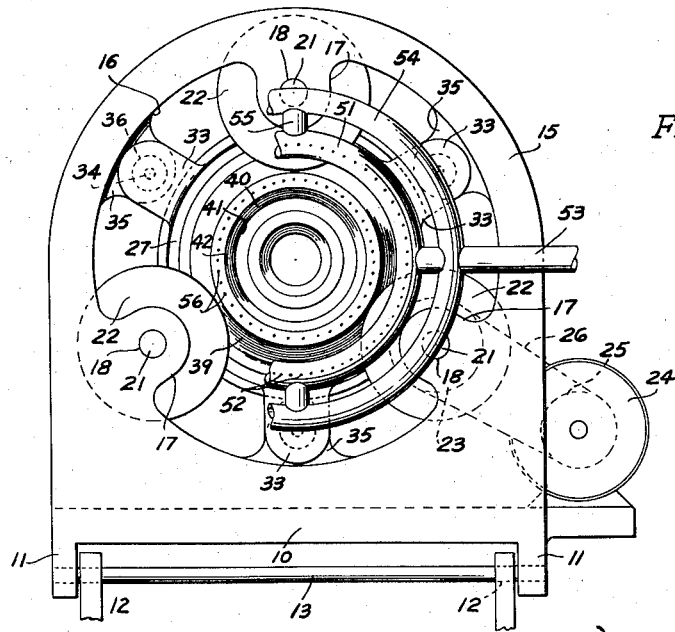

2,874,406

APPARATUS FOR MANUFACTURING GLASS FIBERS

Miles S. Firnhaber, Pewaukee, and Ernest J. Nygren, Milwaukee, Wis., assignors to Sealtite Insulation Mfg. Corp., Waukesha, Wis., a corporation of Wisconsin Application July 16, 1956, Serial No. 598,152

1 Claim. (Cl. 18—2.5)

This invention relates to improvements in apparatus for manufacturing glass fibers.

It has heretofore been proposed to manufacture glass fibers by use of a rotor which centrifugally throws the molten material from the rim of the rotor, there being a blast of steam or other fluid which impinges against the molten glass after it leaves the rotor to cause the formation of fibers.

While these methods are generally satisfactory, there is room for substantial improvement in the length and fineness of the fibers and in the elimination of globules from the final product. Such globules are generally formed when the molten material cools too quickly.

It is a general object of the present invention to provide improved apparatus wherein a cylindrical rotor into which the molten glass is deposited also forms a furnace where the molten glass is broken up into a fine mist by a high pressure blast from a burner and also by the centrifugal force within the rotor, the said action improving the length, fineness and quality of the final product.

A further object of the invention is to provide a construction as above described wherein the cylindrical rotor has its temperature controlled by means of a cylindrical steam jacket surrounding the interior chamber of the rotor, the steam in said jacket being discharged from the discharge end of the rotor and serving as a fiberizing agent.

A still further object of the invention is to provide apparatus as above described wherein there are two annular fiberizing blasts, one of which is within the other, to thereby improve the length and quality of the fibers, one of said blasts being preferably formed by the discharge of the cooling steam from the jacket of the cylindrical rotor.

A further object of the invention is to provide apparatus as above described wherein the steam used for one of the fiberizing blasts is superheated in the jacket which surrounds the rotor so that it is more effective as a fiberizing agent.

A still further object of the invention is to provide improved apparatus for manufacturing glass fibers as above described wherein steam is introduced into the jacket of the rotor by the use of a suitable rotary joint, of which one type is illustrated, using a carbon ring for a pressure seal, the latter being mounted in a novel manner. However, any other suitable material may be used.

A further object of the invention is to provide apparatus as above described wherein the exterior of the cylindrical rotor is tapered toward its discharge end and rotatably supported within a set of tapered rollers, one or more of which is driven, the mounting for the carbon ring being of a floating type and there being means for resiliently urging the ring against the cylindrical rotor to constantly urge the latter into tighter contact with the tapered rollers, which also produces a tighter contact at the steam seal. With this arrangement expansion and contraction of the drum does not affect the center of rotation of the drum.

With the above and other objects in view, the invention consists of the improved apparatus for manufacturing glass fibers, and all of its parts and combinations, as set forth in the claim, and all equivalents thereof.

In the accompanying drawing, illustrating one complete embodiment of the preferred form of the invention, in which the same reference numerals designate the same parts in all the views:

Fig. 1 is a longitudinal vertical sectional view through the improved apparatus; and Fig. 2 is a view looking at the discharge end thereof, parts being broken away.

Referring more particularly to the drawing, there is a supporting frame 10 having front depending ears 11 formed with apertures 12. A rotatably supported rod 13 has its ends extending into the openings 12 of the ears 11 so that the frame 10 is tiltably mounted on the axis of the rod 13. An adjustment bolt 14 extending through a rearwardly projecting ear, and having its lower end engageable with a suitable support, may be manipulated to adjust the angle of the tilt of the frame 10.

The frame 10 has a generally ring-shaped support 15 projecting upwardly from its front end, there being a circular opening 16 within the support 15 and there being bearing projections 17 which project radially from the ring 15 into the opening 16. Each of the projections 17 has a bearing opening 18.

Projecting upwardly from the rear of the frame 10 in rearwardly spaced relationship with respect to the ring 15 is another ring 19 having bearing openings 20. Shafts 21 which carry tapered rollers or equivalent members 22 are rotatably supported in the bearing openings 18 and 20. One of the shafts may carry a pulley 23. An electric motor 24 suitably supported on the frame 10 has a drive pulley 25 which is connected by an endless belt 26 with the pulley 23 to drive one of the rollers 22. While one method of drive is illustrated, the invention is not limited to this arrangement.

Floatingly mounted within the ring 19 is a steam supply ring 27 having an annular steam channel 28 into which steam is introduced by a conduit 29 leading from an outside source. In the inner face of the ring 27 is a circular groove 30 containing a carbon ring 31, the latter having a series of transverse holes 32 communicating with the steam channel 28. Other suitable material may be substituted for the carbon.

The ring 27 has inwardly and radially outwardly projecting supporting lugs 33. Stripper bolts 34 which extend slidably through radially inward projections 35 of the supporting ring 19 have their inner ends threaded into the lugs 33. A coil spring 36 surrounds each bolt. One end of each spring is seated in a recess 37 of a projection 35 and the other end is seated in a recess 38 of the co-operating lug 33. The arrangement is such that there is a constant spring pressure exerted inwardly upon the lugs 33.

Rotatably supported between the three tapered rollers 22 is a cylindrical rotor 39 having an external taper to match the taper of the rollers 22. Within the rotor is a cylindrical chamber 40 having a receiving opening 41 at one end and a discharge opening 42 at the opposite end. The chamber 40 is surrounded by an annular steam jacket 43 of outwardly diminishing cross-sectional area. The rotor has an annular face 44 surrounding the opening 41 which is adapted to have frictional contact with the carbon ring 31 so as to provide a rotary joint. In the face 44 is an annular steam channel 45 which is in registration with the circular series of ducts 32 of the carbon ring, there being a circular series of ducts 46 leading the steam from the channel 45 into the jacket 43.

Communicating with the central opening of the metal ring 27 is a high pressure gas burner 47 for directing a jet of flame 48 under high pressure into the chamber 40 of the rotor to act on the molten glass 49 which is being discharged from a chute 50 into the opening 41 of the rotor.

Surrounding the discharge end of the rotor is a suitably supported steam ring 51 having a circular series of openings 52. Steam from a pipe 53 leading from a suitable source enters a manifold 54 and flows through branches 55 into the steam ring 51.

Operation

In operation molten material from a suitable furnace is directed by the trough 50 into the chamber 40 of the rotating cylinder 39. This is acted upon by the flame jet 48 from the high pressure gas burner 47, which keeps the glass molten within the cylinder. At the same time the heat and the centrifugal force exerted by the rotating drum preliminary breaks up the molten material so that it is discharged in an annular mist from the margin of the opening 42 to be immediately acted upon by the blast of steam from the circular series of openings 56 at the inner end of the steam jacket. This steam has been superheated and all condensation removed within the jacket 43. The steam serves to control the temperature within the chamber 40, as it is cooler than the molten glass and flame 48. The steam from the holes 56 of the rotating cylinder 39 could be used to accomplish the entire fiberizing action. However, to obtain superior results this steam forms a preliminary fiberizing blast which breaks up the molten glass into strings and also alters its centrifugal direction. Thereafter the material is acted upon by the annular blast of steam from the steam ring 51 which further stretches out the strings into fine, long fibers of high quality. It is preferred that the rotor 39 rotate at between 900 to 1300 R. P. M.

Steam from a suitable source introduced through the inlet 29 passes through the carbon ring 31 by way of the ducts 32 therein. This steam then enters the circular channel 48 of the rotor and passes into the steam jacket thereof. Due to the floating mounting for the ring 27 and the use of the springs 36, a constant sealing pressure is maintained between the carbon ring 31 and the end face 44 of the rotor. Because of the floating mounting, this sealing pressure is maintained regardless of expansion or contraction due to temperature differences.

The rotatable cylinder 39 can be readily removed for repairs or replacement by removal of the three stripper bolts 34.

"Glass fiber" as used herein and in the claim is intended to comprehend any mineral wool made from rock, glass, slag or combinations thereof.

Various changes and modifications may be made without departing from the spirit of the invention, and all of such changes are contemplated as may come within the scope of the claim.

What we claim is:

Apparatus for manufacturing glass fibers comprising a rotatable drum having a peripheral wall with a molten glass receiving opening at one end and with a discharge opening at the other end from which the molten glass is to be centrifugally thrown, there being a jacket surrounding said peripheral wall of the drum and said jacket having a tapered exterior wall forming the outer surface of the drum and said jacket having an annular end face surrounding the receiving opening of the drum, a steam ring in contact with said end face and having an annular steam chamber for receiving steam from an outside source, said ring and end face having co-operating openings therein for conducting steam from the steam ring into the steam jacket as the drum rotates, rollers having tapers to conform to the tapered exterior of the drum supporting the latter for rotation, means for driving one of said rollers, and means for resiliently urging the steam ring against said end face of the drum and for constantly maintaining proper engagement between the tapered exterior of the drum and the tapered rollers said jacket having outlet means surrounding the discharge opening of the drum from which steam is discharged to act as a fiberizing medium on the molten glass which is being discharged centrifugally from the drum.

References Cited in the file of this patent
UNITED STATES PATENTS

| | | |
|---|---|---|
| 2,153,825 | Difazio | Apr. 11, 1939 |
| 2,192,944 | Thomas | Mar. 12, 1940 |
| 2,268,816 | Gabeler et al. | Jan. 6, 1942 |
| 2,304,382 | Shoeld | Dec. 8, 1942 |
| 2,328,714 | Drill et al. | Sept. 7, 1943 |
| 2,587,710 | Downey | Mar. 4, 1952 |
| 2,609,566 | Slayter | Sept. 9, 1952 |
| 2,624,912 | Heymes et al. | Jan. 13, 1953 |
| 2,626,166 | Fawick | Jan. 20, 1953 |
| 2,682,079 | Richardson | June 29, 1954 |
| 2,707,847 | Anliker | May 10, 1955 |
| 2,729,849 | Downey | Jan. 10, 1956 |